June 23, 1936. W. A. FEHRMANN 2,045,524
PNEUMATIC JACK
Filed Aug. 6, 1935 2 Sheets-Sheet 2
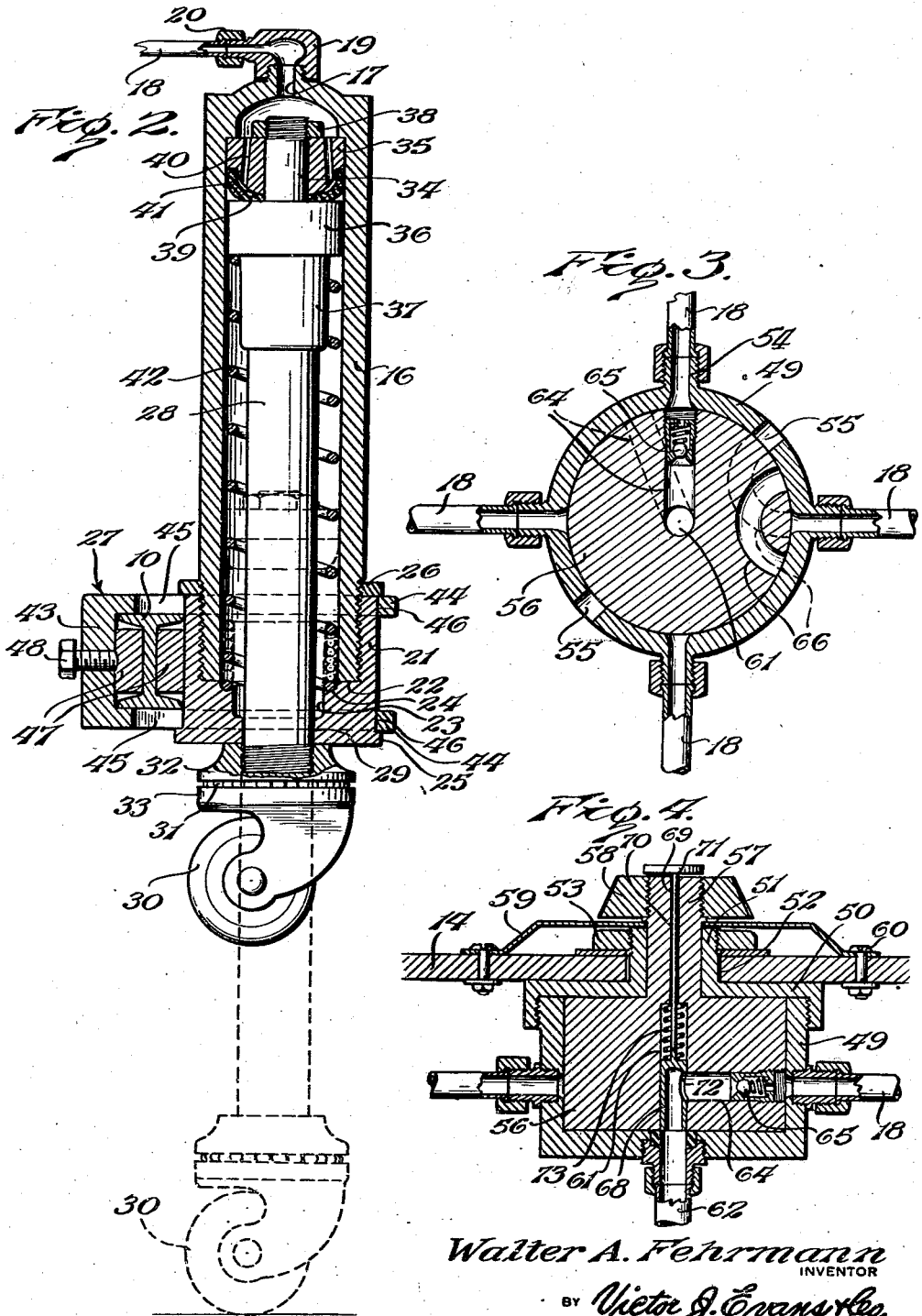

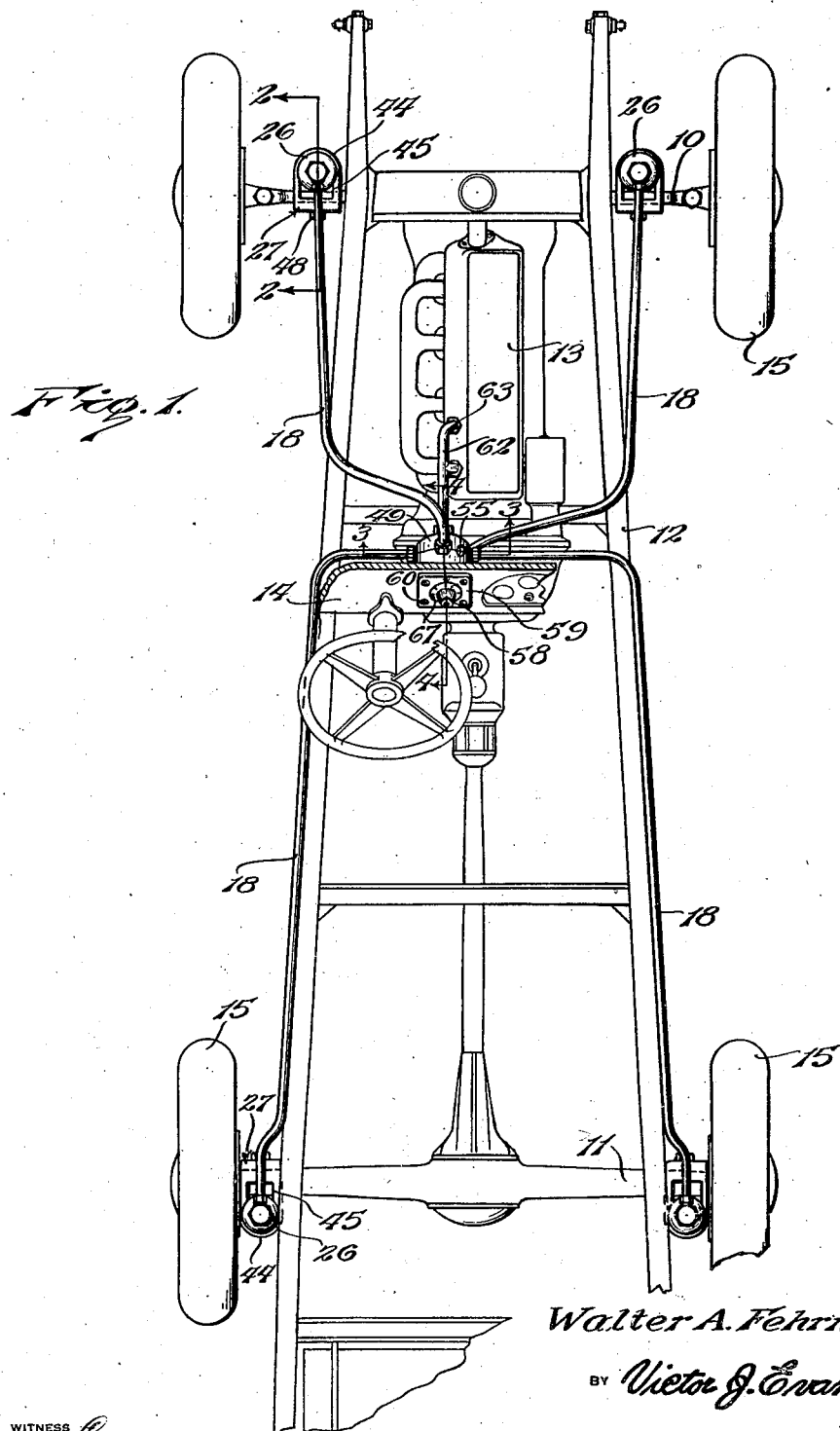

Patented June 23, 1936

2,045,524

UNITED STATES PATENT OFFICE 2,045,524

PNEUMATIC JACK

Walter A. Fehrmann, Vedado, Habana, Cuba

Application August 6, 1935, Serial No. 34,977

4 Claims. (Cl. 254—86)

This invention relates to pneumatic jacks for motor vehicles and has for an object to provide broadly pneumatic jacks fixed to the axles and controlled by a distributing valve within reach of the driver, the jacks preferably utilizing the power produced by the explosions in the vehicle motor cylinders, although a compressed air pump and reservoir may be used so that running of the motor may be dispensed with.

More specifically an object of the invention is to provide a novel pneumatic jack having a piston and a cylinder, the piston being so constructed as to be reenforced against shocks, jars and lateral stresses when in operative position.

A further object is to provide a novel distributor valve for selectively supplying the jacks with a fluid pressure medium.

A further object is to provide a device of this character which will be formed of a few, simple, durable and inexpensive parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a top plan view of a motor vehicle chassis equipped with pneumatic jacks constructed in accordance with the invention.

Figure 2 is a longitudinal sectional view through one of the jacks taken on the line 2—2 of Figure 1.

Figure 3 is a cross sectional view through the distributor valve taken on the line 3—3 of Figure 1.

Figure 4 is a cross sectional view through the distributor valve taken on the line 4—4 of Figure 1.

Referring now to the drawings in which like characters of reference designate similar parts in the various views, 10 designates the front axle, 11 the rear axle housing, 12 the chassis or frame, 13 the motor, 14 the instrument board, and 15 the wheels of a conventional motor vehicle.

In carrying out the invention I provide a pneumatic jack for each end of each axle comprising a cylinder 16 closed at the upper end and open at the bottom, the cylinder having an axially disposed inlet passage 17 in the top to permit a fluid pressure medium being supplied to the interior of the cylinder through an inlet pipe 18. The inlet passage 17 is connected pressure tight to the pipe 18 by means of conventional nut fittings 19 and 20.

The lower end of the cylinder is threaded exteriorly to receive a screw cap 21 which is provided with an internal radially disposed shoulder 22 that abuts the end of the cylinder and is further provided in the shoulder with an axially disposed depression or well 23 extending substantially halfway to the bottom exterior face of the screw cap and having at its juncture with the shoulder an annular seat 24. The screw cap is provided at the bottom with a circumferential shoulder 25 of greater diameter than the diameter of the screw cap and at the end opposite the shoulder there is assembled with the screw cap an annular internally threaded nut 26 of approximately the same outer diameter as the shoulder 25 and of approximately the same inner diameter as the threaded bore of the screw cap. The nut 26 and shoulder 25 form stops or abutments to anchor the cylinder against vertical movement relatively to the securing clamp 27 which will be presently described in detail.

A piston 28 is slidably fitted in the bore of the cylinder and projects downwardly through an axial opening 29 formed in the screw cap, the lower end of the piston being equipped with a caster wheel 30 having bearing balls 31 between the relatively rotatable members 32 and 33 to take the thrust of the piston and permit the caster wheel to swivel when the vehicle is being maneuvered as in shifting the motor vehicle from place to place inside a garage, since the piston itself is non-rotatable due to the pressure required in the cylinder and upon the piston to support the weight of a motor vehicle.

The piston is of novel construction, having the upper end uniformly reduced to provide a stem 34 upon which is slidably fitted a smooth bore nut 35 forming a piston head, the piston being provided below the stem with a uniformly enlarged portion forming a collar 36 which slidably fits the inner wall of the cylinder and below the collar the piston is provided with a uniformly enlarged portion forming an annular boss 37 which is of the same diameter as, and is adapted to seat in, the well 23 when the piston is lowered and coact with the collar 36 in rigidly reenforcing the piston to withstand lateral shocks and stresses when the piston is in operative position.

A nut 38 is threaded on to the end of the stem 34 and confines the piston head 35 against a fibrous washer 39 which is interposed between the piston head 35 and the piston collar 36. Channels 40 are formed in the piston head 35 to permit access of the fluid pressure medium through the piston head and against the washer 39 and collar 36. The lower end of the piston head is circumferentially recessed and rounded to provide a recess 41 to receive the upturned marginal edge of the washer 39 so that the latter may most effectively operate to provide a pressure tight connection between the piston head, the piston collar, and the inner wall of the cylinder.

A helical spring 42 surrounds the piston 28, and boss or bearing 37, one end of the spring being seated against the lower face of the collar 36 and the opposite end of the spring being seated in the heretofore mentioned seat 24 at the top of the well 23. When the piston is in operative position with the piston head lowered to the dotted line position shown in Figure 2, the boss or bearing 37 will be snugly seated in the well 23 while the spring 42 will be compressed between the collar 36 and seat 24 to store up energy to return the piston to its upper or released position after each operation.

For securing the jack cylinder 16 to the axle or axle housing as the case may be the beforementioned securing clamp 27 comprises a bar 43 which is provided with upper and lower arms 44 which are spaced apart sufficiently to receive the axle or housing between them when the securing clamp is slipped laterally over the axle or axle housing, and the arms are provided with elongated slots 45 to receive the screw cap 21, the arms being rounded at the ends, as best shown in Figure 1, to provide bearing surfaces for the annular nut 26 and collar 25 of the screw cap. The screw cap is held against the rounded faces 46 of the slots by means of spacer blocks 47 disposed on opposite sides of the axle 10 for example and confined between the bar 43 and the screw cap 21 by means of a set screw 48 threaded through the bar 43.

To assemble the parts the securing clamp is moved to straddle the axle whereupon the cylinder 16 with the nut 26 thereon may be inserted downwardly through the upper slot in the securing clamp and the screw cap 21 may thereupon be screwed on to the cylinder until the shoulder 25 abuts the lower arm 44 of the clamp. The set screw 48 may now be tightened to draw the clamp tight upon the axle and position the screw cap 21 against the rounded end walls 46 of the slots in the arms.

For supplying the pneumatic jacks with a fluid pressure medium, preferably gases formed by the explosions in the motor cylinders, a distributor valve housing 49 is preferably disposed on the rear face of the instrument board 14 and as best shown in Figure 4 is provided with a threaded cap or cover 50 having an axial tubular boss 51 which projects through an opening 52 in the instrument board 14. A nut 53 is threaded on to the end of the boss and bears against the front face of the instrument board to confine the valve housing in place. The housing is preferably provided with four radially disposed inlet ports 54 which are connected respectively to the supply pipes 18 of the jacks. The housing is also provided with a pair of pressure release ports 55 which are preferably located diametrically opposite each other as best shown in Figure 3.

A valve 56 is rotatably mounted within the housing 49 and is provided with a stem 57 which loosely fits in the boss 51 and is terminally equipped with a knob 58 which is disposed within convenient reach of the driver of the vehicle. A dust plate 59 is disposed on the stem 57 and is bolted as shown at 60 or otherwise secured to the instrument board.

The valve 56 is provided with an axially disposed distributor channel 61 opening through the bottom face and in communication with a pipe 62 which terminates in two or more branches 63 that enter the combustion chambers of the motor cylinders for supplying the distributor channel of the valve with exploded gases under high pressure. The distributor channel 61 is provided with a radially disposed branch channel 64 which opens through the cylindrical outer wall of the valve and may be turned selectively into registration with the inlet ports 54 to operate any desired jack. The branch channel 64 is provided with a ball check valve 65 which after the jack cylinder is filled and the piston forced down to its limit of movement, will prevent release of pressure from the cylinder back through the distributor channel.

An arcuate pressure release channel 66 is disposed in the valve 56, the center of curvature of the channel being located on the outer cylindrical wall of the valve, and the radius of curvature of the channel being such that the channel will cross connect one of the pipes 18 and the adjacent pressure release port 55 in the housing when the valve 56 is turned by the knob 58. The dust plate 59 it will be observed by referring to Figure 1 is provided with suitable indicia 67 to indicate the position of the pipes 18 and pressure release port 66.

By now referring to Figure 4 it will be seen that a tubular valve 68 is slidably fitted in the bore of the distributor channel 61 and is closed at the upper end and open at the bottom end to register with the pipe 62. A rod 69 is integrally connected with the closed upper end of the valve and is slidably fitted in an opening 70 in the stem 57. A button 71 is fixed to the top of the rod outside of the knob 58 and forms means for raising and lowering the slide valve 68. The latter is provided with a lateral port 72 which registers with the branch distributor channel 64 when the valve is in lowered position but is moved out of registration with the branch channel so that the branch channel is sealed by the valve when the valve is raised. A helical spring 73 is housed in the distributor channel 61 and is confined under tension between the end wall of the channel and the top of the slide valve to yieldably hold the slide valve at its downward limit of movement. The pressure from the exploding gases being always in the pipe 62 will force the slide valve 68 upward to closed position to seal the distributor passage 64. When it is desired to operate any particular jack the passage 64 is brought into registration with the pipe 18 of that particular jack whereupon the operator may press down on the button 71 to bring the port 72 of the slide valve into registration with the distributor channel 64 and permit the pressure to equalize between the pipe 62 and the interior of the cylinder to force down the piston to operative position.

From the above description it is thought that the construction and operation of my invention will be fully understood without further explanation.

What is claimed is:

1. The combination with the chassis of a motor vehicle, of a plurality of pneumatic jacks carried by the axles of the chassis, each jack including a cylinder, a piston in the cylinder, a caster wheel carried by the piston, a ported piston head on the piston, a collar on the piston below the head, a flexible washer between the head and the collar exposed to pressure through the ports of the head, an annular bearing boss below the collar on the piston, a spring seated on the piston below the collar, and a well in the bottom of the cylinder having a seat for the spring at the top thereof, the wall of the well snugly receiving said bearing boss when the piston is in operative position and reenforcing the piston to resist lateral stresses.

2. In a pneumatic jack for motor vehicles, a cylinder having an inlet at the top adapted to admit a fluid pressure medium, a screw cap forming a bottom for the cylinder and having a threaded inner wall engaging the cylinder, there being an axial opening in the bottom of the cap, a piston in the cylinder extending through said opening, a caster wheel on the bottom of the piston, said screw cap having an internal shoulder engaging the end of the cylinder, there being an annular well disposed axially in the shoulder and extending substantially halfway to the bottom exterior face of the cap, a helical spring surrounding the piston, a shoulder on the piston forming an abutment for one end of the spring, said internal shoulder on the screw cap forming an abutment for the opposite end of the spring, and a bearing boss on the piston below the shoulder thereof adapted to enter said well when the piston is in operative position and engage the wall of the well, the wall of the well and the bearing boss reenforcing said piston to withstand lateral stresses.

3. In a pneumatic jack for motor vehicles, a cylinder having an inlet at the top to admit a fluid pressure medium, a piston in the cylinder, a piston head having a smooth axial bore and having a recessed rounded bottom face, there being passages in the piston head opening through the top and the bottom faces of the piston head, a uniformly reduced stem on the piston projecting through the bore of the piston head, a nut threaded on said stem to retain the piston head on the piston, a circumferential collar on the piston below and spaced from the piston head and engaging the wall of the cylinder, a packing washer on the stem confined between the piston head and the shoulder and having the outer peripheral portion curved upwardly in said recess in the piston head and engaging the wall of the cylinder, said passages in the piston head conducting the fluid pressure medium from above the piston head to said curved marginal portion of the washer to force the washer tightly against the wall of the cylinder to seal the piston head pressure tight in the cylinder.

4. In a pneumatic jack for motor vehicles, the combination with a motor vehicle axle, of a cylinder, a screw cap forming a bottom for the cylinder, spaced circumferential shoulders on the cap forming stops, a U-shaped attaching clamp straddling the axle and having slots in the legs receiving said screw cap, the stop shoulders of the screw cap bearing against the legs of the clamp and preventing vertical displacement of the cylinder on the clamp, spacer blocks embraced by the clamp and disposed on opposite sides of the vehicle axle, and a set screw carried by the clamp and engaging one of the blocks to force the cylinder against the end walls of the slots in the clamp and rigidly secure the cylinder to the axle.

WALTER A. FEHRMANN.